INVENTOR
K. STEINBUCH-
H. ENDRES - H. REINER

BY Philip M. Bolton
ATTORNEY

Sept. 29, 1959 | K. W. STEINBUCH ET AL | 2,906,824

DEMODULATOR FOR A MULTICHANNEL PULSE POSITION MODULATED SYSTEM

Filed April 21, 1953 | 2 Sheets-Sheet 2

INVENTOR
K. STEINBUCH-
H. ENDRES-H. REINER

BY Philip M. Bolton
ATTORNEY

United States Patent Office 2,906,824

Patented Sept. 29, 1959

2,906,824

DEMODULATOR FOR A MULTICHANNEL PULSE POSITION MODULATED SYSTEM

Karl W. Steinbuch, Stuttgart-Bad Cannstatt, Hermann Endress, Stuttgart-Stammheim, and Hans Reiner, Stuttgart, Germany, assignors to International Standard Electric Corporation, New York, N.Y., a corporation of Delaware Application April 21, 1953, Serial No. 350,198

Claims priority, application Germany April 25, 1952

4 Claims. (Cl. 179—15)

Figure 1:
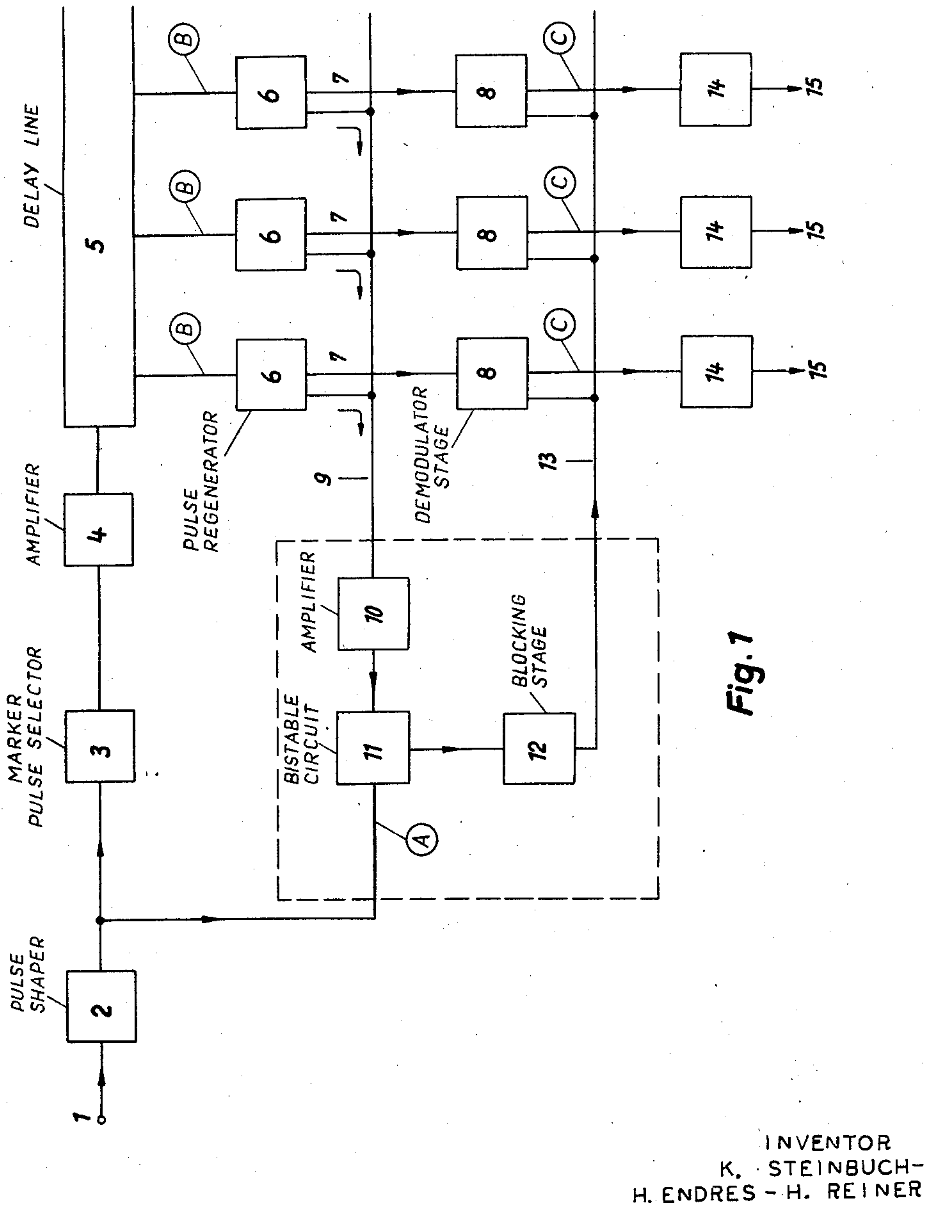

This invention relates to a demodulator and channel separator in a multichannel pulse position modulated system. In multichannel systems with pulse position modulation (pulse time modulation) and multiplex transmission, the receiver is impinged on by a pulse sequence consisting of a time-interlaced pattern of channel pulses (signal pulses), having at the start of each cycle a synchronizing or marker pulse. The signal pulses (channel pulses) represent the messages to be transmitted by their relative time position with regard to a defined reference time. They are of constant length and amplitude. Each signal pulse represents an instantaneous value (scanning value) of the signal wave of the associated channel.

A double task arises at the receiver: On the one hand, the interlaced sequence of pulses must be disentangled, and the single pulses must be distributed to the channels to which they belong; on the other hand, the signal pulses must be demodulated, that is, they must so be changed that from their timing the original message wave train can be reproduced with sufficient accuracy.

As is already known, this demodulation is attained for instance by translating the position-modulated pulses into length-modulated pulses which are then passed on, over an appropriate filter, to the channel output circuits.

For this translation into length-modulated pulses, a number of arrangements have already been described. Thus, it has been suggested to add, to the received PPM (pulse position modulated) pulse sequence, another pulse sequence of the same sampling frequency, i.e. of the same repetition frequency, these latter pulses, however, not being modulated as regards time of occurrence, or pulse position; with the effect that pulse pairs are generated from which the length-modulated pulses are then obtained. Another arrangement in principle, operates in such manner that gate pulses are applied to normally disabled, multivibrator circuits each allotted to a separate channel. These gate pulses, however, of themselves do not cause operation of the multivibrator. Only the impinging position-modulated signal pulse causes operation of the multivibrator so that its condition becomes coincident with the start of the length-modulated pulse that is, it defines the leading edge of the length-modulated pulse. The trailing edge of the gate pulse throws the multivibrator back into its rest position, the length modulated pulse being thereby terminated. This arrangement involves the disadvantage that its adjustment is very critical. An adjustment which is not quite accurate entails the danger that the output impulse of the multivibrator is sustained despite the disappearance of the gate pulse.

It has already been suggested, therefore, to arrange the circuit in such a manner that the leading edge of the gate pulse defines the beginning of the length-modulated pulse whereas the impinging PPM pulse causes its termination. This arrangement works with a comparatively complicated interplay between a selector tube and a gating tube, both being requisite for each channel. For reasons that cannot here be explained in detail, one diode must be added per channel and it is in most cases necessary (for instance when employing an artificial transmission line as the distributor or separating element) to provide a special pulse timing generator that imparts to the gate pulses coming from the separator the required sharply defined square form. Equipment investment will thus be relatively high.

The present invention is concerned with the last mentioned method of demodulation, that is with the system wherein the leading edge of the length-modulated pulse is defined by a gate pulse coming from the distributor or central separator, and the trailing edge is determined by the arrival of the PPM pulse.

An object of the present invention is the provision of an improved demodulator and channel separator of the type described, particularly one which is relatively simple in design and economical in equipment.

Another object of the present invention is the provision of such a demodulator and channel separator in which the parameters of the elements is relatively less critical.

In accordance with a feature of the present invention an arrangement that combines particular simplicity with economy of tubes is made possible by providing a central or common bi-stable tube circuit which in its normal condition will block all channels but which, however, will be brought into the deblocking condition by the gate pulse (arriving from the central artificial transmission line) which is coordinated with a given channel; in such manner that the bistable tube circuit, in cooperation with the gate pulse proper, will release the respective channel for the formation and duration of a pulse until the instant of arrival of the signal pulse which throws back the bistable tube circuit into its normal (blocking) condition.

In each channel there is provided a demodulator tube in which the length-modulated pulse is formed. This channel-owned tube will respond only when two conditions have been satisfied: The central, bi-stable tube circuit must be in its "deblocking" (for all channels) condition. It is brought into this condition by the arrival of each gate pulse coming from the separator, as is further explained below. However, this "deblocking" condition in itself does not suffice to effectuate any deblocking of any channel tube; it only prepares the deblocking of all channel tubes. Only that particular tube is actually deblocked to which there is simultaneously and additionally applied to gate pulse delivered from the artificial transmission delay line or distributor.

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 shows schematically the functional block diagram of a receiving circuit for a PPM System with any number of channels.

Figure 2:
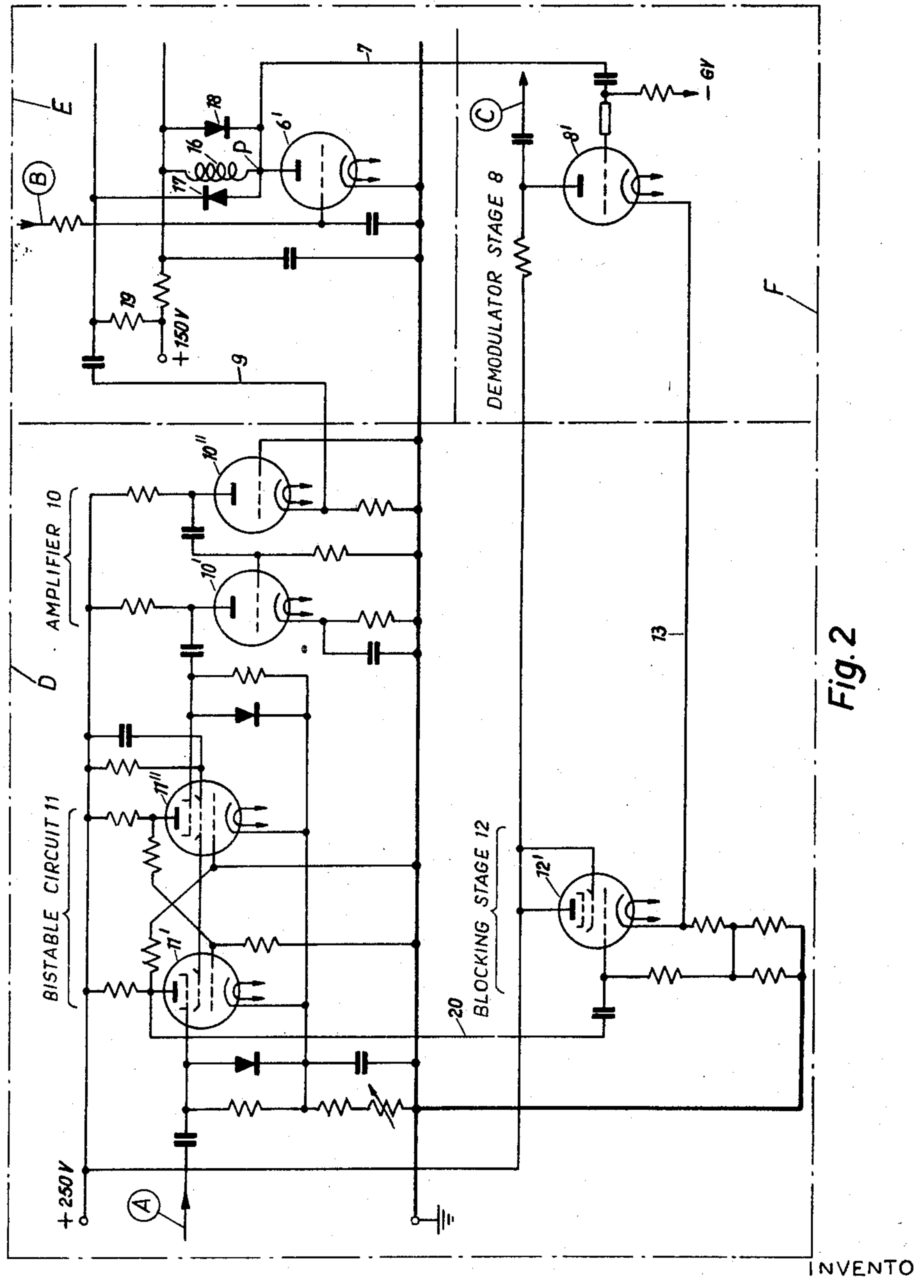

Fig. 2 shows the central, bi-stable tube circuit 11 with the elements 10 and 12 (in Fig. 1 enclosed in dashed line) in detail and in its cooperation with elements 6 and 8 of Fig. 1.

In Fig. 1, the interlinked pulse sequence enters at 1 a pulse regenerating stage 2. A marker pulse selector 3 selects only the marker pulses from the combined pulse sequence, feeding them to the marker pulse amplifier 4.

The marker pulses are passed to the artificial transmission or delay line 5. The components 2, 3, 4, 5 may be of known design.

The time-shifted marker, or synchronizing, pulse will then be derived, at an appropriate tap point of the artificial transmission line 5, at a time interval assigned to the corresponding channel, and over the line designated B, this pulse is then impressed on the elements of that channel. Three channels have been indicated. Naturally, however, there may be any number of channels within customary limits. Gate pulse regenerating stages 6 have the function of forming from the distorted pulse as delivered from the artificial line 5, an exact rectangular or square pulse of the approximate width of a channel period and of appropriate amplitude. Through the lines 7, the gate pulses are then fed to the demodulation stages proper, designated 8. These demodulation stages 8 are in their normal position blocked owing to their high cathode potential as impressed from a blocking stage 12. This will be further explained below. At the instant of formation of the leading edge of the gate pulse, there is generated coincidentally in stage 6 a further short pulse which will thus make its appearance at fixed times as does the gate pulse and which will be termed a "standard" or "short" pulse. Over line 9, it is passed to the tube combination 10, 11, 12. This comprises as the main element the bistable trigger or multivibrator circuit 11, to which is fed through an amplifier 10 the standard pulses from stage 6. The bi-stable circuit in turn controls a blocking tube 12. The bi-stable circuit 11 has two stable conditions. In the first—the "deblocking"—condition, the cathode potential of the demodulating stage 8 is lowered (this stage is connected over line 13 to the blocking tube 12). The bi-stable circuit is switched into "deblocking" condition by the "standard" pulse which is generated simultaneously with the gate pulse in the pulse forming stage 6. For the demodulating stage 8 of the channel to which the respective gate pulse is being applied, the two conditions specified above (deblocking from the direction of the bi-stable tube circuit, and the presence of a gate pulse) are now satisfied: this stage 8 is opened.

It remains opened until the arrival from the pulse forming stage 2, over the line designated A, of the next modulated pulse that throws the bi-stable circuit 11 into its second or "blocking" condition.

By means of the blocking tube 12, this will cause the cathodes of all demodulating stages 8 to be raised in potential to a value such that the gate pulse being applied to the stage 8 is no longer able by itself, to keep the stage opened. Thus a length modulated-pulse is produced.

The length-modulated pulses are fed, in a known manner that is here of no interest, over lines labeled C, to a stage 14, at whose output 15, the recreated signal wave then appears.

Referring now to Fig. 2, some details of the fundamental principle as roughly explained with reference to Fig. 1 will now be presented. The broken-line box D encloses that circuit portion with the units 10, 11, 12 that was enclosed in dashed lines in Fig. 1. Box E encloses one of the pulse forming stages 6, and Box F encloses one of the demodulator stages 8. The letters A, B, C enable an easy understanding of the circuit sections of Fig. 2 in relation to the schematic arrangement of Fig. 1. Only those circuit elements are provided with designations where it seems desirable for a comprehension of the invention. All other circuit elements (resistors, condensers, rectifiers), the function of which is well known from similar circuit arrangements or is obvious to the expert, are included in the drawing in order to complete the picture, but without reference labels. For clarity, designations of the stages of Fig. 1 are applied to their principal elements, that is the tubes of Fig. 2 except that to these designations there is added a prime or double-prime mark. The tubes 6′ prevent crosstalk between the different channels through the artificial line. In addition, they furnish a pulse, sharply defined as regards time, of the desired length and pass it over line 7 to the grid of the demodulator tube 8′. Tube 6′ will normally draw grid current.

If a negative pulse, coming from the artificial line via point B impinges on the grid, the plate current is blocked.

As a consequence, the plate voltage rises while the plate current is decreasing through coil 16. With respect to the oscillating circuit formed by coil 16 itself and its stray capacity (not shown) the arrangement tends to produce an undulation starting with a positive going half-wave. This half-wave, however, is limited to a predetermined level thus practically forming the leading edge of a positive square pulse only, due to the fact that simultaneously rectifier 17 becomes conductive, forming a second way for the decreasing plate current to the high voltage terminal (+150 v.) via resistor 19.

Therefore, a voltage difference appears across resistor 19, from which the short (standard) pulse is derived, which is applied to the cathode of tube 10″, being differentiated by the coupling condenser and the cathode resistor of this tube.

Now, if the negative pulse applied to the grid of tube 6′ is finished, the said tube becomes conductive thus lowering the plate voltage (point P) to its original value. This causes the tendency of the said oscillating circuit to produce a half-wave in the reverse direction. Rectifier 18, however, cuts off the negative half-wave (negative with respect to the said original plate voltage) thus presenting the trailing edge of the above mentioned positive square pulse, which is applied as a gating pulse over line 7 to the grid of the demodulator tube 8′.

At the same instant, therefore, that marks the generation of the gate pulse and its passing over line 7 to the grid of tube 8′, the standard or short pulse arrives, via the two standard pulse amplifier tubes 10′ and 10″, at the suppresser grid of the righthand tube 11″, of the bi-stable circuit 11. The bi-stable circuit is thereby brought into the condition "current left side" (tube 11′). The plate of tube 11′ is connected to the grid of the blocking tube 12′, through line 20. Owing to the condition "current left side," the blocking tube 12′ is blocked and thus furnishes no positive potential over line 13 to the cathode of the demodulator tube 8′. The negative bias voltage −GV of this tube 8′ is so adjusted that the gate pulse as applied to the grid over line 7 will then cause the tube 8′ to conduct.

When the PPM impulse next arrives at A, the relaxation circuit (tubes 11′, 11″) is thrown to the condition "current right side." The blocking tube 12′ now draws current, so that the cathode potential of the demodulator tube 8′ is consequently boosted, over line 13. This will cause blocking of the tube 8′, since the gate pulse is not sufficient by itself to maintain the flow of current. The conduction and blocking of tube 8′ thus produces a length-modulated pulse.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In a time-separation multichannel system a receiver for demodulating position modulated signal pulses to produce length modulated signal pulses comprising a plurality of controllable conduction devices each belonging to a separate channel, means for applying separately to each of said devices only gating pulses which are substantially coincident at each of said devices with a corresponding channel period, means comprising a switchable bi-stable control voltage arrangement common to all the channels substantially simultaneously applying in its first operating condition an unblocking voltage to said conduction devices of all the channels, and in its second operating condition blocking all said conduction devices, means for switching said control voltage arrangement to said first condition substantially in coincidence with the leading edge of each gating pulse to initiate conduction in that particular conduction device to which a gating pulse is simultaneously being applied, and means responsive to each incoming position modulated signal pulse for switching said arrangement to said second condition to thereby terminate conduction of said particular conduction device and produce a length modulated pulse.

2. A receiver for a multichannel pulse position modulated system using a marker pulse and time separation of channel pulses, comprising a demodulator for each channel in the form of a controllable conduction device, a normally blocking stage coupled to all said demodulators, means responsive to a received marker pulse for applying a releasing pulse to said blocking stage and to said demodulator to initiate conduction thereof, said means also being responsive to the receipt of the corresponding channel pulse for applying a blocking pulse to said blocking stage, whereby conduction of said conduction device is terminated.

3. A receiver according to claim 2, further comprising means for selecting and delaying said marker pulses for individual application to each channel demodulator, and means for applying said delayed pulses, as said releasing pulse to said bistable arrangement.

4. A receiver for a multichannel pulse-position modulation system using time-separation multiplexing comprising a common circuit for marker pulses and channel pulses, marker separator means connected to said circuit for obtaining marker pulses to the exclusion of the channel pulses, means controlled by each marker pulse for producing a plurality of time-shifted pulses, said time-shifted pulses being substantially coincident in time with the beginning of the time period allotted to corresponding channels of said multichannel system, a plurality of pulse formers, means for applying to each pulse former a predetermined one of said plurality of time-shifted pulses, said each pulse former comprising means for producing a gating pulse and a standard pulse, the time period of the gating pulse being substantially coincident with the time period allotted to the channel corresponding to the time-shifted pulse applied to said each pulse former, a bistable switching device common to all channels and having two stable voltage conditions, means for controlling one stable condition of said device by said standard pulses, means for controlling the other stable condition of said device by said channel pulses, a plurality of demodulators, means for applying to said demodulators voltages representing said gating pulses and voltages representing each of said stable conditions whereby said channel pulses are converted to length modulated pulses.

References Cited in the file of this patent

UNITED STATES PATENTS

| | | |
|---|---|---|
| 2,423,466 | Peterson | July 8, 1947 |
| 2,486,491 | Meacham | Nov. 1, 1949 |
| 2,652,453 | Alexander | Sept. 15, 1953 |

OTHER REFERENCES

"A Technique for the Design of Pulse Time Multichannel Radio Systems" (Levy), published by the "Journal of the British I.R.E.," November 1949, pages 386–411, particularly dwg. Fig. 16, pg. 405.